United States Patent [19]

Joo' et al.

[11] 4,233,378

[45] Nov. 11, 1980

[54] PROCESS FOR MANUFACTURE OF POSITIVE ELECTRODE FOR LITHIUM/METAL SULFIDE SECONDARY CELL

[75] Inventors: Louis A. Joo'; Frederick C. Miller, both of Johnson City, Tenn.

[73] Assignee: Great Lakes Carbon Corporation, New York, N.Y.

[21] Appl. No.: 968,571

[22] Filed: Dec. 11, 1978

Related U.S. Application Data

[63] Continuation of Ser. No. 838,757, Oct. 3, 1977, abandoned.

[51] Int. Cl.$^2$ .............................................. H01M 4/36
[52] U.S. Cl. ................................. 429/220; 429/103; 429/112; 429/221; 429/223
[58] Field of Search ............... 429/112, 103, 220, 221, 429/223

[56] References Cited

U.S. PATENT DOCUMENTS

| | | | |
|---|---|---|---|
| 3,898,096 | 8/1975 | Heredy | 429/103 |
| 3,933,520 | 1/1976 | Gay et al. | 429/103 |
| 3,992,222 | 11/1976 | Walsh et al. | 429/112 X |
| 4,011,374 | 3/1977 | Kaun et al. | 429/103 X |
| 4,054,729 | 10/1977 | Isenberg | 429/112 |
| 4,086,404 | 4/1978 | Vissers et al. | 429/220 |
| 4,143,217 | 3/1979 | Joo et al. | 429/220 X |

Primary Examiner—Charles F. LeFevour
Attorney, Agent, or Firm—Adrian J. Good

[57] ABSTRACT

An electrode for a high temperature secondary electrical storage cell including an alkali metal negative electrode, a molten salt electrolyte, and a transition metal sulfide as the positive electrode, formed by mechanically loading a precut form or graphite felt or foam with FeS$_x$ powder, coating or impregnating the precut form with a high carbon yield resin, curing the resin at an intermediate temperature, and carbonizing the resin at a temperature below 1000° C.

5 Claims, No Drawings

PROCESS FOR MANUFACTURE OF POSITIVE ELECTRODE FOR LITHIUM/METAL SULFIDE SECONDARY CELL

This is a continuation of application Ser. No. 838,757, filed Oct. 3, 1977, now abandoned.

BACKGROUND OF THE INVENTION

1. Field of the Invention

The invention relates to lithium/metal sulfide energy storage batteries and particularly to novel positive electrodes for such batteries.

2. Description of the Prior Art

Development efforts toward energy storage batteries for load-leveling in electrical utilities during periods of peak power demand and as power sources for electric vehicles have been emphasized in recent years due to the increasing requirement for compact, pollution-free electrical power sources.

A major result of these efforts has been the production of the lithium/sulfur battery, which generally comprises a lithium negative electrode, a molten salt electrolyte, and a positive electrode comprising sulfur and a current collector material. During discharge of such a battery, lithium is oxidized to lithium ions at the negative electrode by the reaction $Li \rightarrow Li^+ + e^-$, which migrate through the electrolyte and react with the sulfur electrode to form lithium sulfide ($Li_2S$) by the reaction $2Li^+ + S + 2e^- \rightarrow Li_2S$. The electrical energy generated by this reaction is removed from the battery through terminals provided therein. The battery may be recharged by supplying current thereto from an external source in a reverse direction, causing the lithium ions to migrate back to the negative electrode, where metallic lithium is formed by electron addition.

During the development of these batteries, it was found that sulfur used alone in the positive electrode tended to escape from the electrode both through vaporization and through the solubility of certain sulfur-bearing species in the molten salt electrolyte. Although these effects can be suppressed by additives such as arsenic or selenium, which lower the activity of the sulfur, it is questionable whether they are sufficiently effective to permit long battery lifetimes.

One of the most significant developments relating to lithium/sulfide power sources has been the discovery that selected metal sulfides are highly efficient as active materials in the positive electrodes of lithium/sulfur batteries. Metal sulfides were considered as alternatives to sulfur on the premise that the activity of sulfur in these compounds would be low enough to eliminate sulfur losses by vaporization or solubility, but not so low as to unduly decrease the battery voltage. ("Development of High-Specific-Energy Batteries for Electric Vehicles", Progress Report for the Period August 1973-January 1974, Argonne National Laboratory, ANL-8058). From a practical standpoint, the metal sulfides of iron, cobalt, nickel, copper and mixtures thereof have the desirable characteristics of low cost, abundance, and lack of toxicity.

SUMMARY OF THE INVENTION

It is an object of this invention to provide a high temperature secondary elecrochemical cell comprising an alkali metal negative electrode, a molten salt electrolyte, a cell separator, and a positive electrode, which has improved mechanical and electrical stability upon repeated cycling by the means of firmly embedding finely divided particles of the cathodic material in place within a carbonaceous matrix by mechanical loading and subsequent impregnation of the preformed electrode with a high carbon yield resin or pitch.

It is also an object of this invention to provide a lower cost fabrication method for volume production of such cells by simple preforming of the carbon or graphite felt or foam, and the use of a process more readily adaptable to automation.

It is also an object of this invention to provide a more homogeneous structure with greater reproducibility in production, by control of particle loading and pore volumes.

It is also an object of this invention to provide an electrode having greater conductivity and more reproducible conductivity from piece to piece.

All of the above objects may be achieved by the process of the invention which uses a preformed or precut carbon or graphite felt loaded with the required amount of $FeS_x$ powder by mechanical means of vibration, dusting and rolling. This loaded felt is coated or impregnated with a high carbon yield thermosetting resin or pitch, which is then heated at an intermediate temperature for a time sufficient to volatilize the solvents and cure or cross-link the resin, typically 150° C. for eight hours. Resins preferred are phenol-aldehyde or furan derivatives and coal tar or petroleum pitches. Cross-linking bonds the $FeS_x$ particles firmly into the matrix, holding them in place in intimate attachment to the matrix in a manner such that subsequent cycling and mechanical stresses have little effect on the homogenity of the structure.

The structure is then subjected to a higher temperature carbonizing cycle, preferably 3-6 days with the temperature increasing gradually to 950° C., which converts the resin residue to carbon thereby firmly bonding the $FeS_x$ into the conductive matrix structure.

By this invention, the particles of iron sulfide are bound in a conductive matrix which allows room for expansion during the repeated cycling and volumetric expansion during the reaction:

$$4Li^+ + FeS_{2(s)} = 2Li_2S_{(s)} + Fe_{(s)}$$

It is also possible to use other metal sulfides of the transition metals especially copper, cobalt and nickel, or mixtures thereof in a similar manner, and other chalcogenides such as the oxides of the above metals.

DESCRIPTION OF THE PREFERRED EMBODIMENT

EXAMPLE 1

A precut or preshaped graphite felt form of approximately 90% void volume with fibers of 8-10 microns in diameter, and a surface area of about 0.20 square meters/gram is mechanically loaded with iron sulfide (of a particle size of less than 100 mesh) to a loading of about 30% by volume, and coated or impregnated and inserted in a mold with an inserted preformed current collector, under alternate cycles of vacuum and pressure with 60 parts by volume of a liquid phenol-formaldehyde resin (of 60% non-volatile solids by weight in solvent) to provide a preformed electrode precursor. This shaped form is then heated slowly to 150° C. and held at that temperature for eight hours to cross-link the resin and bond the iron sulfide particles in place. It is then removed from the mold and heated slowly to a final temperature in five days of 950° C.

The phenol-aldehyde resin is a phenol-formaldehyde condensation product with a non-volatile by weight of 60% and a viscosity of 70 centipoise at 25° C. Coal tar pitches with softening points of from 70°-250° C. or similar petroleum based pitches may be used.

The preshaped current collector is a molybdenum metal plate of the requisite size with an attached electrical connection.

EXAMPLE 2

Using the same cell structure as Example 1, a furan derived thermosetting resin derived from furfuryl alcohol is used in the same manner as Example 1.

The resulting cells have by volume from 3-30% carbon or graphite felt, 15-50% metal sulfide or oxide, 5-15% carbon deposited from the thermosetting resin, and 20-77% void volume.

We claim:

1. In a positive electrode for a high-temperature secondary electrochemical cell which uses a positive electrode, a lithium or lithium alloy negative electrode, a molten salt electrolyte containing lithium ions, and a porous separator, and wherein the active material of said positive electrode is a metal sulfide or a metal oxide or mixture thereof 100% of which passes through a 100 mesh per inch screen, and being selected from the group consisting of the sulfides and oxides of iron, copper, cobalt, and nickel deposited within a preformed solid continuous carbonaceous matrix selected from the group consisting of: graphite felts; carbon fiber felts; and carbonaceous foams with a void volume of from 50 to 95%, the improvement wherein said active material is bonded in place in said preformed matrix by the carbonized residue of a high carbon yield resin.

2. The positive electrode of claim 1 wherein the high carbon yield resin is a phenol-formaldehyde condensation resin in solvent used to impregnate the preformed solid continuous carbonaceous matrix under alternate cycles of vacuum and pressure, said resin then being cross-linked by heating said matrix at a temperature of 150° to 200° C. for approximately eight hours, and carbonized by gradually heating said matrix reaching a final temperature of less than 1000° C., preferably 950° C., over a period of three to six days.

3. The positive electrode of claim 1 wherein the high carbon yield resin is selected from the group consisting of the derivatives of furfural and furfuryl alcohol and their condensation products, said resin being used to impregnate the preformed solid continuous carbonaceous matrix under alternate cycles of vacuum and pressure, said resin then being cross-linked by heating said matrix at a temperature of 150° to 200° C. for approximately eight hours, and carbonized by gradually heating said matrix, reaching a final temperature of less than 1000° C., over a period of three to six days.

4. The electrode of claim 3 or 1 wherein the high carbon yield resin is a pitch selected from the group consisting of hot melted coal tar and petroleum pitches with softening points of from 70° to 250° C. and wherein said matrix is impregnated with said hot-melted pitch under alternating cycles of vacuum and pressure, then gradually heated to a carbonizing temperature of approximately 950° C. over a period of three to six days.

5. A positive electrode structure for a high-temperature secondary electrochemical cell utilizing a lithium or lithium alloy negative electrode, and a porous separator, said positive electrode comprising a preshaped graphite fiber felt form of approximately 90% void volume, with fibers of 8-10 micron diameter, and a surface area of approximately 20 sg.m./g., said form being mechanically loaded to approximately 30% by volume with cathodically active material selected from the group consisting of the sulfides and oxides of iron, copper, cobalt, and nickel, and mixtures thereof, with a particle size such that 100% of said active material passes through a 100 mesh per inch screen, the improvement comprising said active material being held in place by the carbonized residue of a high carbon yield resin selected from the group consisting of the solutions in water or organic solvents of phenol-formaldehyde condensation products and furan type resins, said form being impregnated with said resin solution under alternating cycles of vacuum and pressure, said form then being heated to cross-link said resin at approximately 150° C. for about 8 hours, then heated slowly to carbonize the resin, reaching the carbonizing temperature of approximately 950° C. over a period of three to six days, the resulting structure of said positive electrode having from 20-77% void volume, approximately 30% by volume said active material within a range of 15 to 50%, approximately 10% by volume graphite fiber, and from 5-15% by volume of the carbonized residue of said high carbon yield resin bonding said active material in place.

* * * * *